(12) United States Patent
Keightley

(10) Patent No.: US 8,992,140 B2
(45) Date of Patent: *Mar. 31, 2015

(54) HOLE SAW ASSEMBLY

(76) Inventor: Kym John Keightley, Adelaide (AU)

( * ) Notice: Subject to any disclaimer, the term of this patent is extended or adjusted under 35 U.S.C. 154(b) by 445 days.

This patent is subject to a terminal disclaimer.

(21) Appl. No.: 12/580,242

(22) Filed: Oct. 15, 2009

(65) Prior Publication Data

US 2010/0322730 A1 Dec. 23, 2010

Related U.S. Application Data

(63) Continuation of application No. 11/628,453, filed as application No. PCT/AU2005/000817 on Jun. 8, 2005, now Pat. No. 7,621,703.

(30) Foreign Application Priority Data

Jun. 8, 2004 (AU) ................................ 2004903089

(51) Int. Cl.
*B23B 51/05* (2006.01)
*B23B 51/04* (2006.01)

(52) U.S. Cl.
CPC ......... *B23B 51/0473* (2013.01); *B23B 51/0426* (2013.01); *B23B 2251/606* (2013.01); *B23B 2260/082* (2013.01); *B23B 2260/138* (2013.01)
USPC ............................. 408/204; 279/8; 408/239 R

(58) Field of Classification Search
USPC .................. 408/204–209, 703, 239 R; 279/8; 403/299
See application file for complete search history.

(56) References Cited

U.S. PATENT DOCUMENTS

| | | | |
|---|---|---|---|
| 3,267,975 A | | 8/1966 | Enders |
| 3,973,862 A | * | 8/1976 | Segal ............................. 408/204 |
| 4,669,928 A | | 6/1987 | Mediavilla |
| 5,108,235 A | | 4/1992 | Czyzewski |
| 5,154,552 A | * | 10/1992 | Koetsch ......................... 408/204 |
| 5,226,762 A | * | 7/1993 | Ecker ............................. 408/204 |
| 5,246,317 A | * | 9/1993 | Koetsch et al. ................ 408/204 |

(Continued)

FOREIGN PATENT DOCUMENTS

| | | |
|---|---|---|
| GB | 2257381 | 1/1993 |
| WO | 97/14526 | 4/1997 |
| WO | 03/024677 | 3/2003 |

*Primary Examiner* — Daniel Howell
(74) *Attorney, Agent, or Firm* — Sand & Sebolt

(57) ABSTRACT

The present invention relates to a hole-saw assembly (10) including a hole saw (26) having at one end a plurality of cutting teeth and at the other end two shafts. The assembly includes a mandrel (16) coaxially aligned with said hole-saw and including a body having two bores there through coaxially aligned with said shafts. An annulus (20) located on top of the body is coaxially aligned with said mandrel and hole saw and includes two holes, the annulus rotatable around its longitudinal axis from a first to a second position. In the first position the annulus holes are aligned with the bores and shafts allowing the shafts to be freely insertable and removable and in the second position the holes are misaligned to lock the shafts to the annulus. The mandrel further includes a pair of driving pins (22) adapted to engage driving apertures (24) found in hole saws especially larger ones. Typically the driving pins may biased to enable the assembly to be used even with those hole saws that do not include driving apertures and that also enables easier assembly of the device. A compressible O-ring (42) may further facilitate the operation of the assembly. This device avoids the problem of thread stripping.

11 Claims, 7 Drawing Sheets

(56) References Cited

U.S. PATENT DOCUMENTS

| | | | |
|---|---|---|---|
| 5,868,532 A * | 2/1999 | Spenser | 408/204 |
| 5,967,709 A * | 10/1999 | Thuesen | 408/204 |
| 6,120,221 A * | 9/2000 | Alm | 408/204 |
| 6,357,973 B2 * | 3/2002 | Chao | 408/204 |
| 6,623,220 B2 * | 9/2003 | Nuss et al. | 408/204 |
| 6,705,807 B1 * | 3/2004 | Rudolph et al. | 408/1 R |
| 6,857,831 B2 * | 2/2005 | Davis | 408/206 |
| 7,073,992 B2 | 7/2006 | Korb et al. | |
| 7,097,397 B2 | 8/2006 | Keightley | |
| 7,101,124 B2 | 9/2006 | Keightley | |
| 7,104,738 B2 * | 9/2006 | Cantlon | 408/204 |
| 7,163,362 B2 | 1/2007 | Keightley | |
| 7,175,372 B2 * | 2/2007 | Davis | 408/204 |
| 7,621,703 B2 * | 11/2009 | Keightley | 408/204 |
| 7,850,405 B2 * | 12/2010 | Keightley | 408/204 |
| 7,959,371 B2 | 6/2011 | Keightley | |
| 2004/0179911 A1 | 9/2004 | Keightley | |
| 2007/0036620 A1 | 2/2007 | Keightley | |
| 2010/0322730 A1 | 12/2010 | Keightley | |

\* cited by examiner

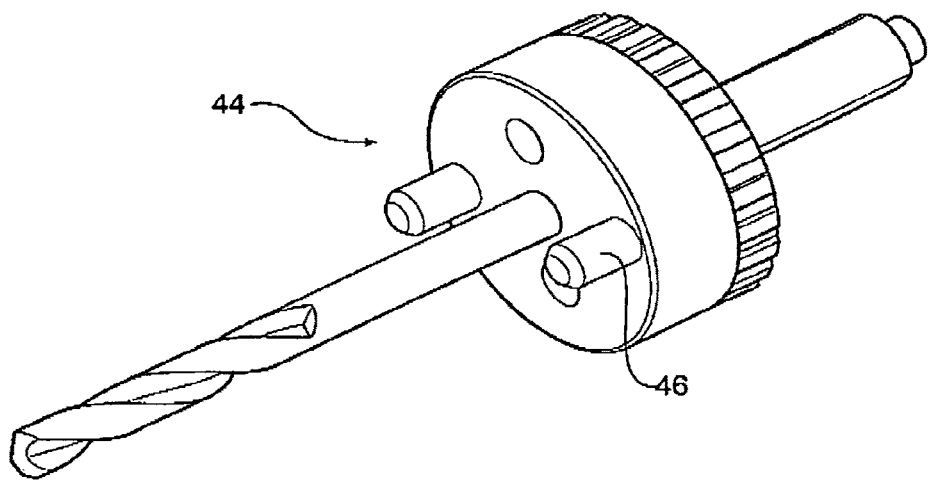
Fig 5
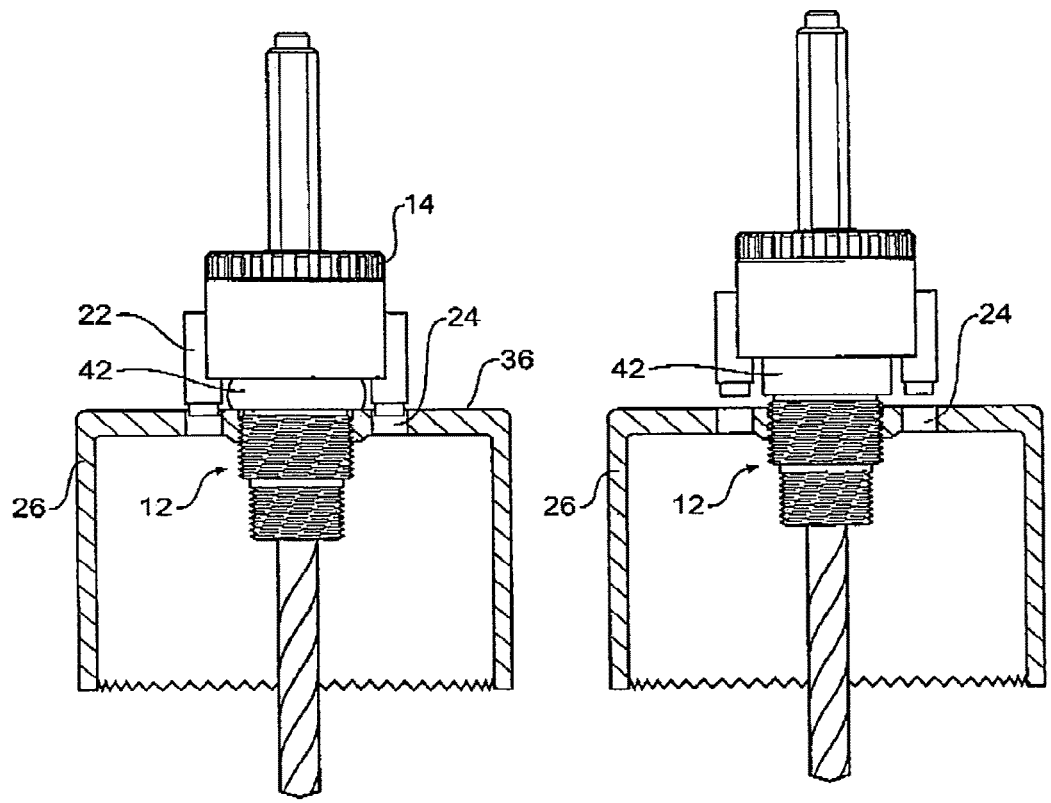
Fig 6a          Fig 6b

HOLE SAW ASSEMBLY

CROSS-REFERENCE TO RELATED APPLICATIONS

This application is a continuation of U.S. patent application Ser. No. 11/628,453, now U.S. Pat. No. 7,621,703, filed Sep. 10, 2007, which entered the National Phase of Serial No. PCT/AU2005/000817, filed Jun. 8, 2005. The entire disclosure of these prior applications is hereby incorporated by reference.

BACKGROUND OF THE INVENTION

The present invention relates to a holes saw and in particular to a rotatable hole saw supported by a mandrel which is inserted in a drill chuck or the like.

Hole saws are widely used to cut circular holes for many applications. Typically a hole saw is cylindrically shaped with cutting teeth at one end and a threaded boss at the other for screwing into a mandrel for rotational operation in a drill.

A pilot drill extends from the centre of the mandrel and through the centre of the hole saw as it is screwed onto the mandrel. As it always protrudes further than the length of the hole saw blade and hence contacts the material to be cut first, the pilot drill is the first to cut the hole in the material and acts as the exact centre of the hole saw diameter. This hole then acts as a guide or "pilot" around which the hole saw then concentrically cuts a larger hole.

In a previous application PCT/AU02/01296, whose contents are incorporated by express reference herein, the present applicant disclosed an arrangement whereby a threaded boss is screwed into a hole saw which is then quickly mounted and demounted from a mandrel.

However in very large hole saws, the rotational force developed (or torque required to rotate the hole saw) when operating the mandrel in heavier machinery may strip the thread where the hole saw couples with the boss. This may also be true when cutting through very hard material.

To overcome these problems, in a further application PCT/AU2004/000376, whose contents are also incorporated herein by express reference thereto, there is proposed an apparatus for overcoming the problem of stripping threads by the insertion of two loose pins to engage the boss and saw to avoid driving on the threads.

The problem with this type of arrangement is that it is awkward to assemble the apparatus and use the pins which, when the hole saw is not engaged to the mandrel, are loose and can easily be lost. Further the hole saw may be somewhat loose on the mandrel when such pins are used, since they are abutting against the mandrel and may separate the mandrel from the boss.

It is an object of the present invention to overcome at least some of the above-mentioned problems or provide the public with a useful alternative.

SUMMARY OF THE INVENTION

Therefore in one form of the invention there is proposed a hole-saw assembly including:
a hole-saw having at one end a plurality of cutting teeth and at the other end two shafts and at least one driving aperture;
a mandrel coaxially aligned with said hole-saw and including a body having two bores therethrough coaxially aligned with said shafts;
an annulus coaxially aligned with said mandrel and hole saw and including two holes, said annulus rotatable around its longitudinal axis from a first to a second position, wherein in said first position said annulus holes are aligned with said bores and said shafts allowing said shafts to be freely insertable and removable and in said second position said holes being misaligned thereby locking said shafts to said annulus; at least one driving pin integrally attached so said mandrel and adapted to engage said at least one driving aperture.

Preferably said assembly includes a base from which therein extend the two shafts said base including a mounting means for mounting of a hole-saw thereon.

In preference there are two symmetrically opposing driving apertures.

In preference said hole-saw-assembly further includes a compressible O-ring positioned between said base and said hole-saw.

Preferably said hole-saw further includes a threaded inner bore adapted to engage a threader outer projection extending from said base.

Preferably said shafts include a flute adjacent said outer end and a cap on said outer end, the cap having an inner surface adapted to engage the annulus when said annulus is in said second position to thereby lock the shafts from longitudinal movement from the annulus.

Preferably said hole-saw further includes a drill-bit mounted on said mandrel, said drill-bit extending through and beyond said hole-saw.

In preference said driving means are longitudinally biased.
Preferably said biasing is provided by a spring.
In a further form of the invention there is proposed a connector assembly including: a base having a longitudinal axis and including an attachment means for attaching a device thereto, said base further including a connecting means;
a co-axial mating means adapted engage said base;
a co-axial locking ring adapted to rotate around its longitudinal axis between a first and a second position relative to said mating means, said locking ring adapted to engage said base connecting means when in said first position to prevent longitudinal relative motion of said base, mating means and said locking ring;
a set of driving pons integrally attached to said base and adapted to engage correspondingly shaped driving apertures in said device.

BRIEF DESCRIPTION OF THE DRAWINGS

The accompanying drawings, which are incorporated in and constitute a part of this specification, illustrate several implementations of the invention and, together with the description, serve to explain the advantages and principles of the invention. In the drawings.

FIG. 5 is a perspective view of a mandrel embodying the present invention and including integral driving pins;

FIG. 6 (*a*) is a cross-sectional of the mandrel of FIG. 5 engaging a hole saw having provision for driving pin engagement before being screwed completely onto the hole saw;

Figure 7A:
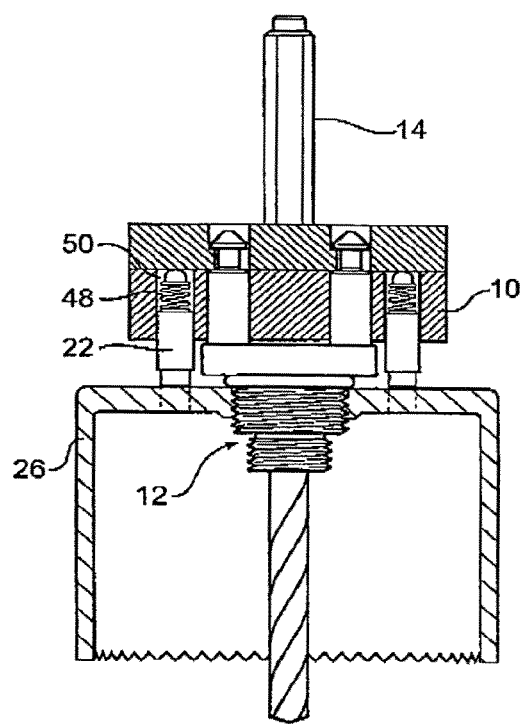
Figure 7B:
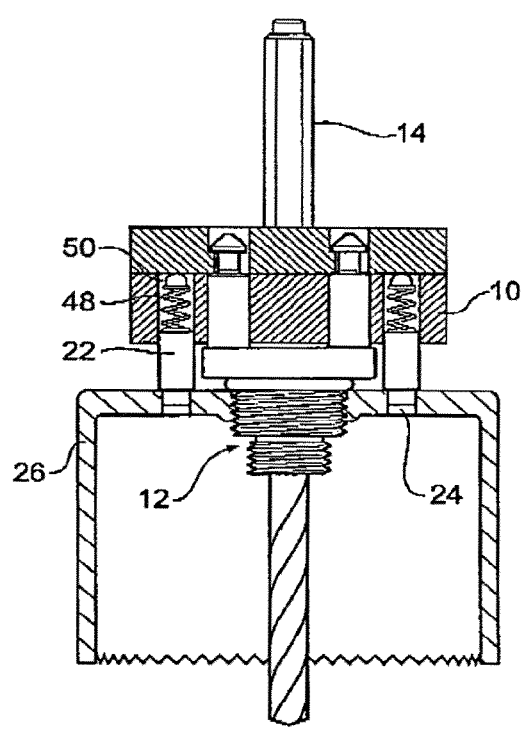
Figure 8:
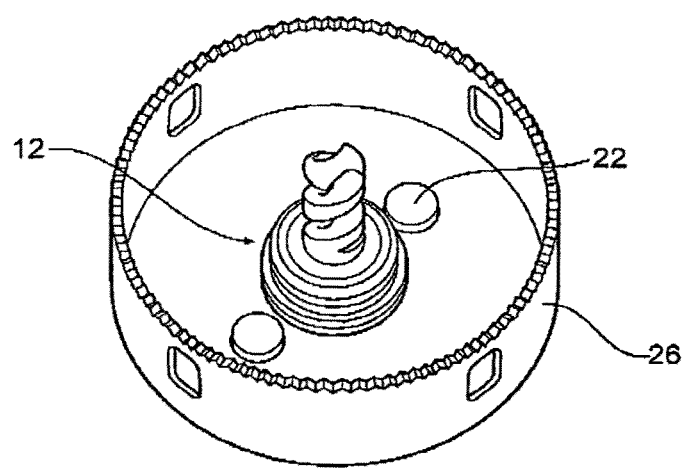
Figure 9:
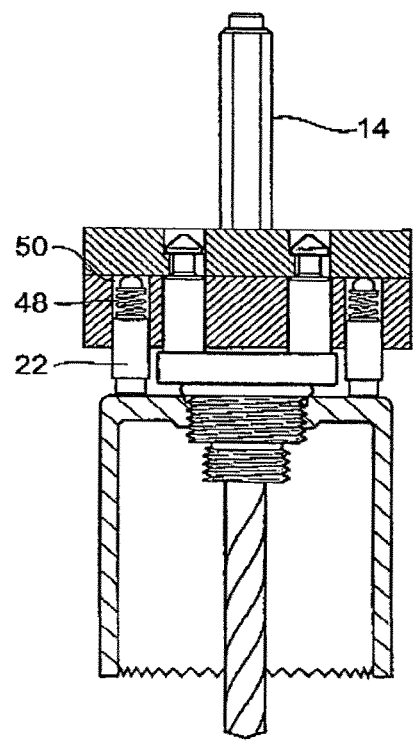

(*b*) is the view as in 5(*a*) but when the boss is screwed onto the hole saw and the assembly is operational;

FIG. 7 (*a*) illustrates a further embodiment of the present invention when the driving pins are in a biased configuration and when the assembly is being screwed onto a hole saw having driving pins;

(*b*) illustrates the assembly as in 7(*a*) when screwed onto the hole saw;

FIG. 8 is a perspective view of the underside of the hole saw and assembly of FIG. 7(*b*);

FIG. 9 is the assembly as in FIG. 7 but when used on a hole saw not having driving pins provisions;

DESCRIPTION OF THE PREFERRED EMBODIMENTS

The following detailed description of the invention refers to the accompanying drawings. Although the description includes exemplary embodiments, other embodiments are possible, and changes may be made to the embodiments described without departing from the spirit and scope of the invention. Wherever possible, the same reference numbers will be used throughout the drawings and the following description to refer to the same and like parts.

The present invention, as mentioned above, relates to an improvement in a hole-saw assembly of the type described in PCT/AU03/01296 and that includes a hole-saw having at one end a plurality of cutting teeth and at the other end two shafts. The assembly includes a mandrel coaxially aligned with said hole-saw and including a body having two bores there through, coaxially aligned with said shafts. An annulus located on top of the body is coaxially aligned with said mandrel and hole saw and includes two holes, the annulus rotatable around its longitudinal axis from a first to a second position. In the first position the annulus holes are aligned with the bores and shafts allowing the shafts to be freely insertable and removable, and in the second position the holes are misaligned to lock the shafts to the annulus. Such an arrangement allows the hole-saw and the mandrel to be easily and quickly mountable and demountable.

To prevent stripping the threads as proposed in PCT/AU2004/000376 the hole saw assembly may include floating drive pins that are configured to fit within the pre-existing apertures of the hole saw. These pre-existing aperture are a feature of all hole saws and are used to engage older hole saw mandrels.

The present invention seeks to improve upon this arrangement making it easier to assemble the assembly. In a further embodiment the present invention may also provide for a mandrel including integral driving pins that may be used on a hole saw that does not include any pre-existing driving apertures.

Figure 1:
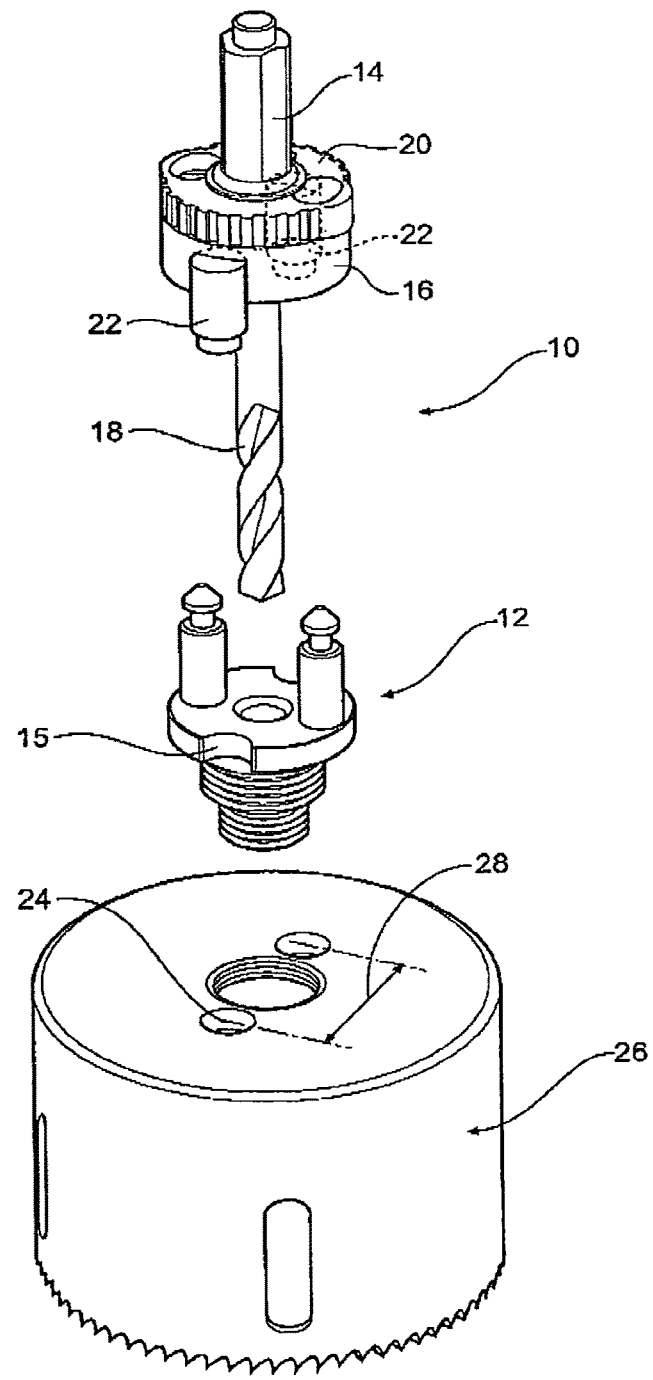
FIG. 1 is a perspective exploded view of a mandrel and hole saw assembly embodying the present invention.

FIG. 1 illustrates an exploded view of a hole saw assembly 10 including a double threaded boss 12. The hole saw assembly includes a shank 14, a mandrel 16 (or driving means), a drill bit 18, and an annulus 20 (or locking ring) that locks the boss 12 to the mandrel 16. For specific details of the hole saw assembly the reader is referred to the applicant's International Patent Application PCT/AU02/01296 whose content is incorporated by reference herein.

Figure 2:
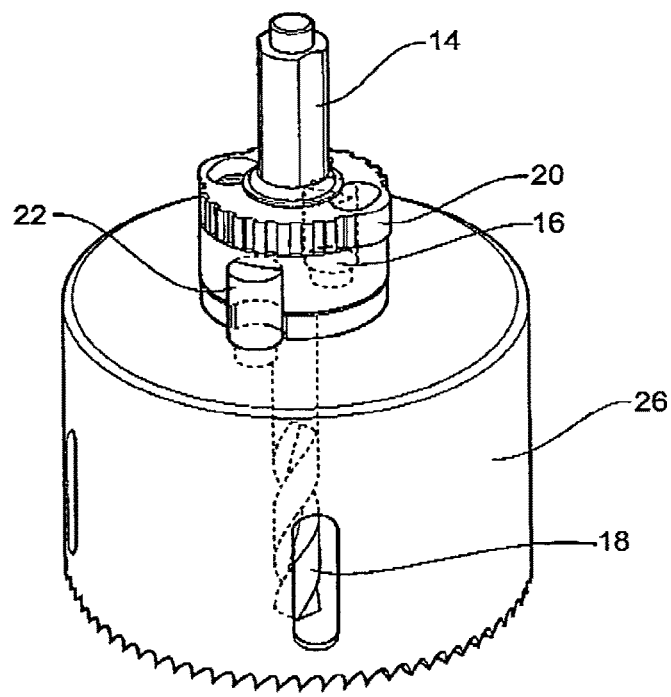
FIG. 2 is the assembly of FIG. 1 when in an assembled state.

To avoid stripping the threads of a hole saw, especially where there are significant rotational forces, the mandrel 16 further includes integrated driving pins 22 that are adapted to engage driving apertures 24 of the hole saw 26. Typically there are two driving pins located opposite each other. As illustrated in FIG. 2, when the boss 12 has been screwed onto the hole saw 26, the driving pins 22 are of a length sufficient to extend into the driving apertures 24.

Figure 3A:
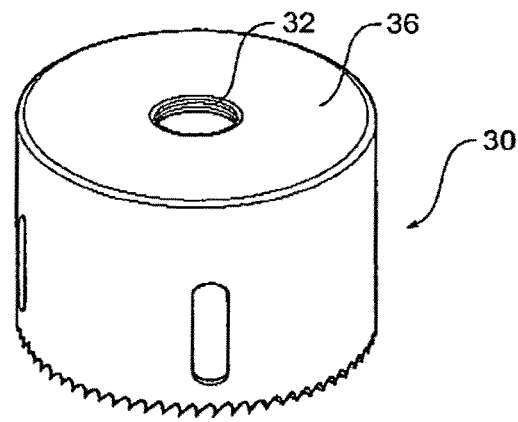
FIG. 3 (*a*) illustrates a larger size hole saw with no provision for engagement of driving pins;
  (*b*) illustrates a small size hole saw with a normal depth boss;
  (*c*) illustrates a small size hole saw with a deeper depth boss.
Figure 3B:
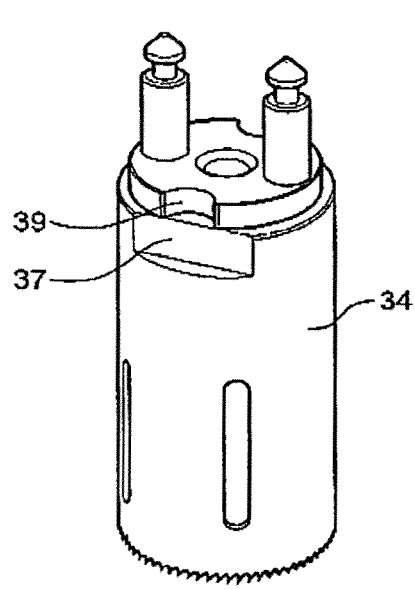
Figure 3C:
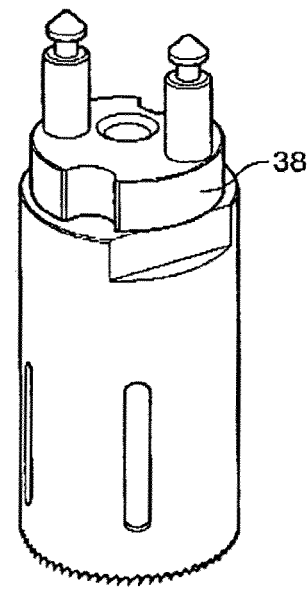

The driving apertures are typically found in hole saws whose diameter is greater than some 40 mm, since the separation 28 of the driving pins is conventionally 25 mm (centre to centre of each pin). However, some hole saws may indeed not have driving pins if they are, for example, being used to cut soft materials. An example of such hole saws are found in FIGS. 3(*a*) and 3(*b*), the former hole saw 30 with a diameter greater than 40 mm only including centre thread 32 and the latter smaller hole saw with a diameter just greater than 25 mm. If one were to use the mandrel as illustrated in FIG. 1 then the driving pins, having a longer length, would abut against the top surface 36 of the hole saw. To overcome this problem one may very well have a separate mandrel 38 as illustrated in FIG. 3(*c*) whose thickness is greater than the extension of the driving pins so that even when fully screwed onto the holes saw the driving pins are not in contact with the surface 36. Otherwise as shown in FIG. 3(*b*) most smaller hole saws include a indent 37 that is typically provided to enable a tool such as a wrench to engage the hole saw. In this case if the mandrel grooves 39 are aligned with the indents then the problem of the driving pins abutting the hole saw is overcome.

Figure 4A:
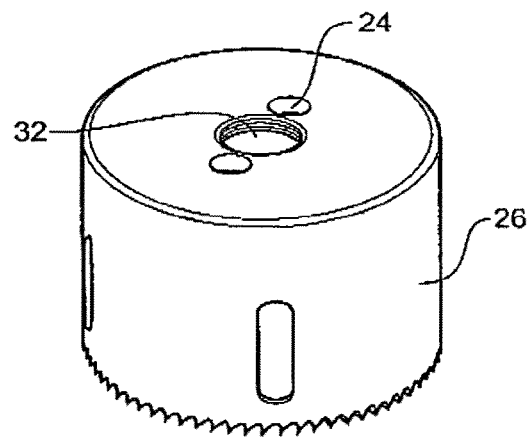
FIG. 4 (*a*) illustrates a large hole saw with driving pin holes for engagement of driving pins;
  (*b*) illustrates the hole saw as in 4(*a*) when attached to a boss;
  (*c*) is a cross-sectional view of the hole saw of 4(*b*)
Figure 4B:
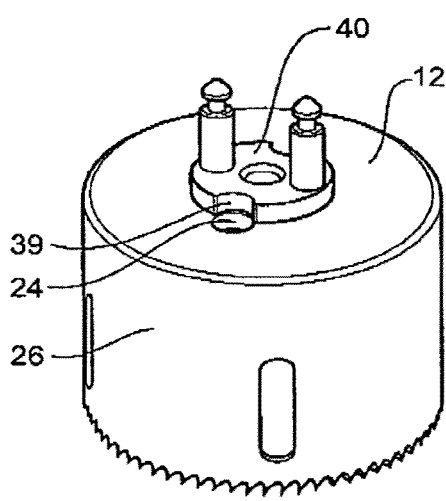
Figure 4C:
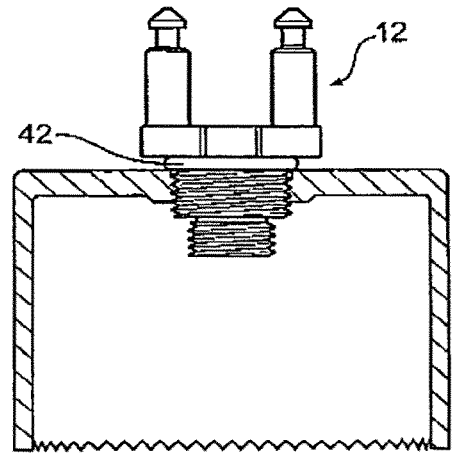

Thus the reader should appreciate that the inclusion of driving pins overcomes the problem of thread stripping since the rotational force is provided from the mandrel to the hole saw through the driving pins, rather than through the thread. Thus as illustrated in FIG. 4(*a*) a typical hole saw 26 includes the standard threaded central aperture 32 as well as driving apertures 24. To use the present assembly it is typical for the boss 12 to be screwed onto the hole saw 26. Since the upper disk 40 of the boss is typically greater than 25 mm in diameter, as illustrated in FIG. 49(*b*) the boss grooves 39 are adapted to align with the driving apertures 24 to ensure that the driving pins 22 extend into the hole saw.

To further assist in the attachment of the boss to the hole saw there may be provided a compressible O-ring 42. This ring may assist in aligning the grooves 39 with the driving apertures 24 since it enables the boss to rotate through an angle of some 90 degrees whilst the boss and the hole saw are tightly engaged to each other. This allows the user to ensure that the alignment can occur without over tightening on the threads, as would be the case if no O-ring is used. Such an O-ring may be made from well known materials such as rubber.

Whilst FIGS. 1-4 illustrated a small mandrel whose outer diameter was smaller than 25 mm, thus necessitating that the driving pins to extend from the outside of the mandrel, in some cases, as shown in FIG. 5, mandrel 44 may indeed be much larger than 25 mm so that the driving pins 46 extend from the mandrel rather than on the outside of it.

Illustrated in FIGS. 6(*a*) and 6(*b*) is a further advantage of the O-ring 42. As the boss 12 is being screwed onto the hole saw 26 the O-ring 42 starts to be compressed. Provided that the thickness of the O-ring is sufficient so that the compression of the O-ring begins before the driving pins 22 abut the upper surface 36, when finally they do abut and snap into the driving apertures, the O-ring springs back whilst still maintaining the contact between the hole saw and the boss. This ensures that any vibration and play between the assembly and the hole saw is, if not eliminated, greatly reduced.

However, in a further preferred embodiment of the present invention the driving pins 24 may be longitudinally biased so that they are biased outwardly by the use of springs 48 that extend the driving pins outwardly from a driving pin bore 50. The reader should appreciate the advantages of this configuration as illustrated in FIGS. 7(*a*) and 7(*b*). The biasing of the springs allows the assembled mandrel and boss to be screwed onto the hole saw whether or not there is an O-ring present. As the driving pins then abut the upper surface of the hole saw they are compressed back into bore 50 until they align with the apertures 24. At that stage the biasing forces them into the apertures 24 effectively locking the driving pins into position as illustrated in FIG. 8.

Such an arrangement may also very well be used on hole saws that do not have a driving aperture. In that case, as shown in FIG. 9, the biased driving pins are simply compressed into their bore 50 enabling the assembly to be firmly screwed onto the hole saw without having to worry about the driving pins locking onto the hole saw as would be the case if they were fixed.

Further advantages and improvements may very well be made to the present invention without deviating from its scope. Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

In any claims that follow and in the summary of the invention, except where the context requires otherwise due to express language or necessary implication, the word "comprising" is used in the sense of "including", i.e. the features specified may be associated with further features in various embodiments of the invention.

The invention claimed is:

1. A hole-saw assembly including: a hole-saw having at one end a plurality of cutting teeth and at least one driving aperture, said hole-saw including a centre thread; a boss including a threaded shaft adapted to engage the hole-saw centre thread, said boss including two locking shafts; a mandrel coaxially aligned with said hole-saw and including a body having two bores therethrough coaxially aligned with said locking shafts; an annulus coaxially aligned with said mandrel and hole saw and including two holes, said annulus rotatable around its longitudinal axis from a first to a second position, wherein in said first position said annulus holes are aligned with said bores and said shafts allowing said shafts to be freely insertable and removable and in said second position said holes being misaligned thereby locking said shafts to said annulus; at least one driving pin integrally attached so said mandrel and adapted to engage said at least one driving aperture; and wherein the boss further includes a notch so dimensioned to accommodate the driving pin to extend alongside the boss.

2. A hole-saw assembly as in claim 1 wherein there are two symmetrically opposing driving apertures.

3. A hole-saw assembly as in claim 1 further including a compressible O-ring positioned between said boss and said hole-saw.

4. A hole-saw assembly as in claim 1 wherein said shafts include a flute adjacent said outer end and a cap on said outer end, the cap having an inner surface adapted to engage the annulus when said annulus is in said second position to thereby lock the shafts from longitudinal movement from the annulus.

5. A hole-saw assembly as in claim 1 including a drill-bit mounted on said mandrel, said drill-bit extending through and beyond said hole-saw.

6. A hole-saw assembly as in claim 1 wherein at least one said driving pin is longitudinally biased.

7. A hole saw assembly as in claim 6 wherein said biasing is provided by a spring.

8. A hole-saw assembly as in claim 1 wherein the boss includes two notches so located and dimensioned to accommodate the driving pins to extend along side the boss.

9. A hole-saw assembly as in claim 8 wherein the driving pins are so dimensioned to extend along side the boss and engage the driving apertures of the hole-saw.

10. A boss for use with a hole saw and a mandrel, the hole saw having two driving apertures, said boss including a threaded shaft to engage a centre thread of the hole saw and an attachment means to attach the boss to the mandrel; said boss including two symmetrically opposed notches of a location and dimension to provide longitudinal access to the driving apertures by driving pins supported by the mandrel.

11. A hole-saw assembly including: a hole-saw having at one end a plurality of cutting teeth and two driving apertures, said hole-saw including a centre thread; a boss including a threaded shaft adapted to engage the hole-saw centre thread, said boss including an attachment means to attach the boss to a mandrel said boss further including two notches so located and of a size to co-axially align with the driving apertures; two driving pins integrally attached to said mandrel and adapted to engage the driving apertures passing through the notches.

\* \* \* \* \*